United States Patent
Paruchuri et al.

(10) Patent No.: US 9,436,695 B2
(45) Date of Patent: Sep. 6, 2016

(54) DYNAMICALLY EXPIRING CROWD-SOURCED CONTENT

(71) Applicant: Microsoft Technology Licensing, LLC, Redmond, WA (US)

(72) Inventors: Sandeep Paruchuri, Seattle, WA (US); Scott Borton, Seattle, WA (US); James Coliz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/628,505

(22) Filed: Feb. 23, 2015

(65) Prior Publication Data
US 2015/0169608 A1 Jun. 18, 2015

Related U.S. Application Data

(63) Continuation of application No. 13/802,837, filed on Mar. 14, 2013, now Pat. No. 8,983,976.

(51) Int. Cl.
*G06F 7/04* (2006.01)
*G06F 17/30* (2006.01)

(52) U.S. Cl.
CPC ... *G06F 17/30117* (2013.01); *G06F 17/30038* (2013.01); *G06F 17/30424* (2013.01); *G06F 17/30861* (2013.01); *G06F 17/30864* (2013.01); *G06F 17/30997* (2013.01); *G06F 17/30* (2013.01)

(58) Field of Classification Search
CPC ............. G06F 17/30864; G06F 17/30861; G06F 17/30424; G06F 17/30
See application file for complete search history.

(56) References Cited

U.S. PATENT DOCUMENTS

| | | |
|---|---|---|
| 2008/0096594 A1 | 4/2008 | Vinding |
| 2008/0222202 A1* | 9/2008 | Solomon ............... G06N 5/043 |
| 2009/0281722 A1 | 11/2009 | Bitonti et al. |
| 2011/0093515 A1 | 4/2011 | Albanese |
| 2012/0048203 A1 | 3/2012 | Bonham |

(Continued)

FOREIGN PATENT DOCUMENTS

| | | |
|---|---|---|
| EP | 2541484 A1 | 1/2013 |
| WO | 2012172160 A1 | 12/2012 |

OTHER PUBLICATIONS

"Office Action Issued in European Patent Application No. 14713708.7", Mailed Date: Mar. 29, 2016, 9 Pages.

(Continued)

*Primary Examiner* — Bruce Moser
(74) *Attorney, Agent, or Firm* — Judy Yee; Micky Minhas

(57) ABSTRACT

Example apparatus and methods concern dynamically expiring crowd-sourced content (CSC) in a crowd-sourced database. An example apparatus may include logic for acquiring the CSC, where the CSC is data produced by a mobile device concerning a point of interest. The example apparatus also includes logic for producing an evaluation of the CSC and logic for determining an expiration criteria based on the CSC, the evaluation, and the user. The CSC may be data about a point of interest. The evaluation may be based on the completeness, timeliness, or contents of the CSC. The expiration criteria may be established based on the evaluation of the CSC and a user profile. The expiration criteria or user profile may be manipulated based on confirmation or repudiation of the CSC by a different user or by curation of the CSC.

13 Claims, 8 Drawing Sheets

(56) References Cited

U.S. PATENT DOCUMENTS

| | | |
|---|---|---|
| 2012/0102165 A1 | 4/2012 | Gruen et al. |
| 2013/0144949 A1 | 6/2013 | Mitchell, Jr. et al. |
| 2014/0100914 A1* | 4/2014 | Cober .................. G06F 21/6254 705/7.29 |
| 2014/0201276 A1* | 7/2014 | Lymberopoulos et al. .. 709/204 |

OTHER PUBLICATIONS

"Destination Local Projects", Retrieved from <<http://web.archive.org/web/20131719334900/http://www.nesta.org.uk/areas_of_work/creative_economy/destination_local/assets/features/destination_local_projects>>, Retrieved on Feb. 11, 2013, 4 Pages.

Yuen, et al., "Task Recommendation in Crowdsourcing Systems", In Proceedings of the First International Workshop an Crowdsourcing and Data Mining, Aug. 12, 2012, 6 Pages.

"Notice of Allowance Issued in U.S. Appl. No. 13/802,837", Mailed Date: Nov. 21, 2014, 12 Pages.

"Supplementary Search Report Issued in European Patent Application No. 14713708.7", Mailed Date: Feb. 12, 2016, 3 Pages.

Dearborn, Mich, "Ford and PlugShare Team Up to Help Ford C-MAX Energi and Fusion Energi Drivers Find Plugs With MyFord Mobile", Retrieved from <<http://company.plugshare.com/news/press-releases/2013/02/07/ford-and-plugshare-team-up/>>, Feb. 7, 2013, 3 Pages.

Fitzgerald, Elizabeth, "Creating User-Generated Content for Location-Based Learning: An Authoring Framework", In Journal of Computer Assisted Learning, vol. 28, Issue 3, Jun. 1, 2012, 13 Pages.

Hughes, Neil, "Apple Investigating Crowd-sourced Rankings for Local Search Results", Retrieved from <<http://appleinsider.com/articles/11/09/08/apple_investigating_crowd_sourced_rankings_for_local_search_results>>, Sep. 8, 2011, 8 Pages.

Khan, Asif, "How Push Notifications on Mobile Are Changing Hyperlocal", Retrieved from <<http://streetfightmag.com/2012/06/22/how-push-notifications-on-mobile-are-changing-hyperlocal/>>, Jun. 22, 2012, 7 Pages.

Marcus, et al., "Crowdsourced Databases: Query Processing with People", In Proceedings of 5th Biennial Conference on Innovative Data Systems Research, Jan. 9, 2011, 5 Pages.

"International Search Report & Written Opinion Issued in PCT Application No. PCT/US2014/021463", Mailed Date: Sep. 12, 2014, 9 Pages.

Tarkiainen, et al., "Crowdsourcing Accessibility Related Information from POI-Destinations in Finland", In Proceedings of the 18th World Congress on Intelligent Transport Systems, Oct. 16, 2011, 11 Pages.

Wang, et al., "Estimating the Completion Time of Crowdsourced Tasks Using Survival Analysis Models", In Proceedings of the Workshop on Crowdsourcing for Search and Data Mining, Feb. 9, 2011, 4 Pages.

\* cited by examiner

DYNAMICALLY EXPIRING CROWD-SOURCED CONTENT

CROSS-REFERENCE TO RELATED APPLICATIONS

This application is a continuation of U.S. patent application Ser. No. 13/802,837, filed Mar. 14, 2013.

BACKGROUND

Mobile devices like cellular phones are frequently used to search for local points of interest. The quality of the search result depends on the quality, freshness, and validity of the data available concerning those points of interest. Information concerning points of interest may be gathered in different ways. Conventionally, employees of the search provider may have roamed locations acquiring and inputting data about points of interest. Additionally, crowd-sourced data may also have been acquired. Unfortunately, crowd-sourced data may be inaccurate in a number of ways. Regardless of how the data was acquired, the freshness and continuing validity of the data controls the value of a search for a local point of interest. There may be nothing more fatal to a local search than directing a search user to a location that is no longer valid. Collecting information about relevant local destinations has been a challenge, particularly when the local destinations are highly transient and only semi-documented, if documented at all. Even if accurate relevant information can be acquired, a subsequent challenge concerns determining the ongoing validity of that information. Data that was initially valid may become invalid as a transient vendor moves, runs out of produce, or closes down for the day. Thus, a local search application may need to decide whether to initially provide and whether to continue to provide information about a point of interest.

Consider a city where a significant portion of the economy involves highly transient street vendors. The street vendors may be transient from season to season depending on what they sell (e.g., fresh fruit), may be transient from day to day depending on what they have available (e.g., fresh catch of the day), may be transient from time-of-day to time-of-day (e.g., hot dog vendor near office building at noon but near baseball stadium in evening), may be transient in their operating hours (e.g., only stay open while they have fresh fish) or may be transient for other reasons. These impromptu and semi-official destinations may be an integral part of the consumer landscape and thus relevant to local searches. Unfortunately, even if accurate, relevant, and valid information can be acquired about these types of points of interest, the information may have a very short lifespan due to the temporal and spatial transiency of the vendors.

Removing data that is no longer valid from a crowd-sourced database may be equally or even more important than getting useful data into the crowd-sourced database in the first place. A user of a local search application may experience a first level of frustration if their search for a transient vendor produces no results. However, the user may experience a second, much higher level of frustration if a local search results in a wild goose chase for a vendor that has already closed up shop for the day or moved on.

A point of interest that may be transient, either temporally or spatially, may be referred to as a hyperlocal point of interest (HPOI). Acquiring timely crowd-sourced content concerning an HPOI facilitates improving the quality of a local search. Removing stale information also facilitates improving the quality of a local search. Like it is for the fruit or fish vendor, freshness matters to crowd-sourced content concerning moving targets like HPOI. Unlike the fruit or fish vendor who has a constant incentive (e.g., sales) to insure their product is fresh, there may be little incentive for potential crowd-sourcers to provide information about HPOI. Additionally, even if a crowd-sourcer enters data about the current state of an HPOI, the crowd-sourcer may not be able to accurately predict or report on when the HPOI may become out-of-date.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods concern dynamically expiring contributions to a crowd-sourced database. The database may store information concerning hyperlocal points of interest (HPOI). Information (e.g., user generated content) about an HPOI may be expired based on the quality of submissions concerning the HPOI, on the frequency of the creation or updating of HPOI, on actual observations, or based on other factors.

To make a good decision concerning expiring an HPOI or crowd-sourced content, crowd-sourced content may be evaluated on the quality of data submitted. The quality of data may be measured by different criteria. The criteria may include the quantity of data, key fields that add value to later relevance, the frequency of similar submissions in a cluster area, or other criteria. If the quality is high enough, an expiration criteria may be determined or updated using the crowd-sourced content. The expiration criteria may control the period of time for which the data will be considered "fresh" (e.g., valid) and thus for how long the data will be provided in response to a local search. A confidence level may be associated with the expiration criteria. The confidence level may affect how much, if at all, subsequently acquired data concerning a point of interest will affect the expiration criteria for the point of interest. The confidence level may also control whether data is expired based on the expiration criteria computed from crowd-sourced content or whether other (e.g., default) rules will be applied. Over time, example apparatus and methods may learn about patterns concerning certain points of interest. The patterns may affect the expiration criteria or the confidence level for certain points of interest.

To mitigate the risk of malicious fraud, where a user seeks to provide disinformation (e.g., incorrect location, incorrect operating hours), submissions that are voted down or otherwise invalidated may be used to adjust a trustworthiness rating for a user to indicate the user is less trustworthy. Similarly, to encourage ongoing accurate and complete contributions, submissions that are voted up or otherwise validated may be used to adjust a confidence level for a user to indicate that the user provides more useful information than other users. The trustworthiness rating for a user may be part of a user profile. Information in the user profile may be considered when establishing expiration criteria or confidence levels.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Figure 1:
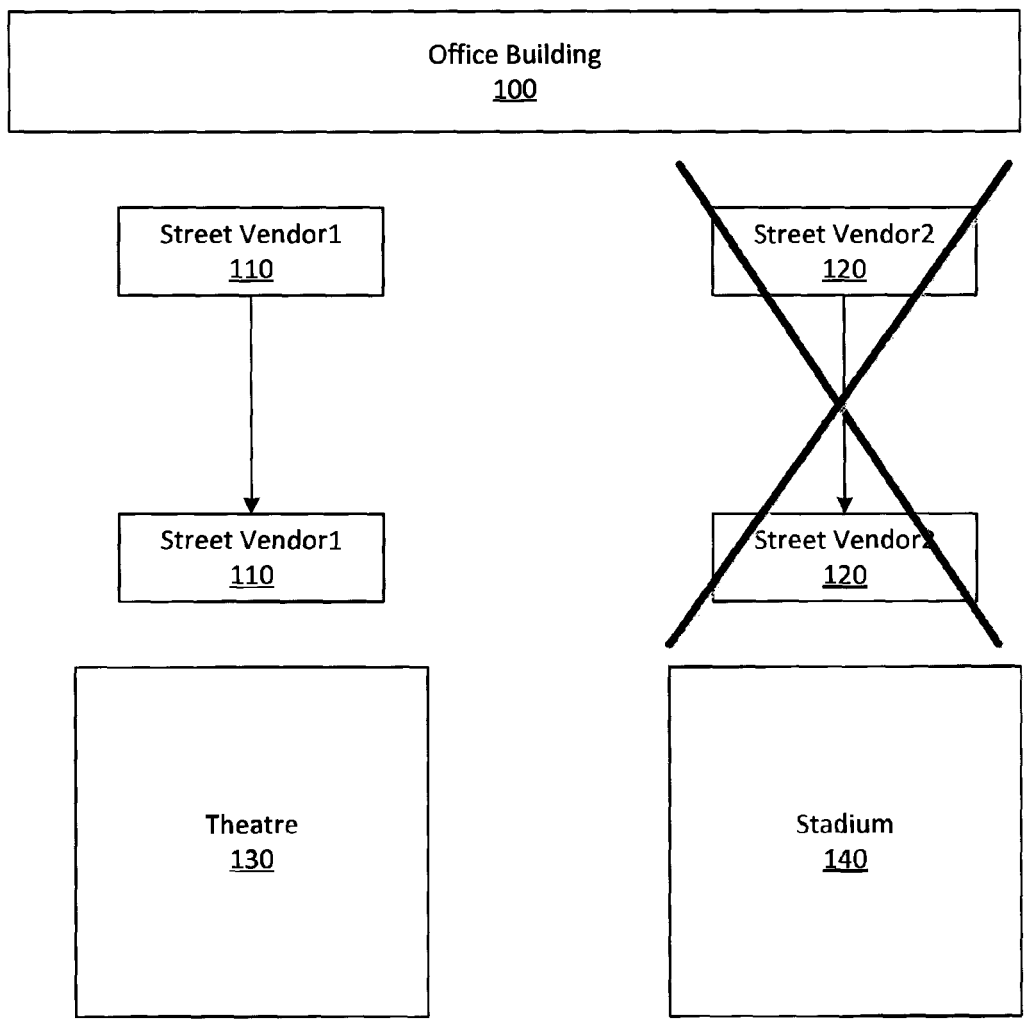
FIG. 1 illustrates an example geography that includes hyperlocal points of interest and traditional points of interest.

Example apparatus and methods facilitate dynamically expiring crowd-sourced content. The crowd-sourced content may be stored in a crowd-sourced database. The crowd-sourced content may concern hyperlocal points of interest (HPOI). HPOI are characterized by their transient nature, either temporally or spatially. For example, a street vendor may move their cart from location to location depending on the time of day (e.g., lunch, dinner, before game, after game), depending on the time of year (e.g., shady location in summer, sunny location in winter), depending on local conditions (e.g., covered location while raining, open location while sunny), depending on their product (e.g., fruit, fish, hot dogs, hats), or depending on other factors. Not only may vendors move their cart, but they may open at different times and close at different times based, for example, on when their product is delivered and when they run out of their product. Example apparatus and methods may display crowd-sourced content concerning an HPOI until an expiration criteria is satisfied and the HPOI is expired. The expiration criteria may be determined based on the quality of data submitted about the HPOI, based on observations acquired over time concerning the HPOI, based on the frequency with which data is entered for an HPOI, or on other factors. In one embodiment, expiration criteria may actually be removed for an HPOI for which there have been more than a threshold number of validated submissions. For example, after a hot dog vendor has been reported at the same location during the same time of day for a threshold number of days in a row (e.g., Monday to Friday for 1 week), the HPOI for the hot dog vendor may be transitioned into a traditional or fixed point of interest that does not have expiration criteria.

To promote accuracy, the confidence level of contributions may be based, at least in part, on attributes of individual registered contributors. Contributors may be voluntarily and knowingly registered using, for example, an identity associated with their mobile device. As the contributor provides data, and as that data is voted up, confirmed, successfully curated, or otherwise validated, the confidence level of a contribution by the user may be adjusted. The confidence level may also be based, at least in part, on attributes of collections of contributors. For example, a contributor may have a set of friends in a social network. Contributions from the set of friends may be considered in light of the trustworthiness of individual members and of the group. In another example, a contributor may coincidentally be providing information about the same HPOI as another contributor. The two contributors may not be members of a social circle, may not interact in anyway, and may not even know that the other exists. However, due to circumstances (e.g., working in neighboring high rise office buildings) the two contributors may both provide information about the same hot dog vendor every day. One worker may get a hot dog at 11:50 a.m. every morning and the other worker may get a hot dog at 12:15 p.m. every day. Each worker may provide information about the hot dog vendor because they know their friends will be eating at the hot dog cart after them and they want to their friends to know where the vendor is that day. If both of these paired but coincidental contributors provide information about a predicted expiration time or event for the HPOI, then the confidence level for the expiration may be increased.

To improve the accuracy of expiration criteria for an HPOI, the quality of data submitted about the HPOI may be analyzed. The quality may be measured by different criteria. One criterion by which quality may be measured is the completeness of the data provided. For example, if 100% of the data necessary for a complete HPOI record is provided, the expiration criteria may receive a higher quality score than if a lesser amount of data is provided. The quality score may be proportional to the amount of data provided. For example, if only half the data necessary for a complete HPOI record is provided, the quality score may be discounted by 50%. While a linear example is provided, other non-linear (e.g., exponential) functions may be employed to relate the quality score and the amount of data provided.

Another criterion by which quality may be measured is the type of data provided for an HPOI. For example, a photograph tagged with GPS co-ordinates may be considered more valuable than a simple text description. Thus, a GPS tagged photograph contribution may have a higher quality value and thus produce a higher confidence level for expiration criteria than a simple text description. More generally, key fields that add value to later relevance for an HPOI may be weighted more heavily in a quality measure.

Another criterion by which quality may be measured is the frequency of submissions in a cluster area. If a threshold number of contributors provide a threshold number of contributions concerning an HPOI or a type of HPOI in an area, then the contributions may receive a higher quality score that in turn drives up the confidence level of the expiration criteria for the HPOI. This factor reflects the idea that a single data point may be questionable, but a number of similar data points acquired from a variety of users may be more reliable.

Another criterion by which quality may be measured is the subsequent treatment of user generated content associated with an HPOI. This aspect of crowd-sourcing concerns using the crowd to both provide information and to verify information. In general, crowd-sourced refers to obtaining needed services, ideas, or content by soliciting and accepting contributions from a large group of undefined people, particularly from an online community. Crowd-sourced refers to the combined efforts of crowds of volunteers or others who each contribute a small portion that ultimately adds up to a relatively large or significant result.

If the user generated content leads to expiration criteria that are voted up, then the quality level for the user generated content may be increased. Voting up involves subsequent viewers of the HPOI record associated with the user generated content indicating that they agree with or "approve" or otherwise have gained value from the expiration predicted in the HPOI record or from the HPOI record in general. Voting down involves subsequent viewers of the HPOI record indicating they disagree with or "disapprove" or otherwise did not gain value from the expiration predicted in the HPOI record or from the HPOI record in general. Voting down may be an explicit or an implicit action. For example, calling or viewing an HPOI but then not visiting the HPOI is an implicit down vote. Similarly, voting up may also be an explicit or an implicit action. For example, visiting an identified HPOI may be an implicit up vote. Subsequent treatment may also include receiving similar or matching contributions concerning the HPOI. When two or more contributors provide similar contributions about the same HPOI in a relevant time frame (e.g., within an hour, within a day), then it may be more likely that the contributions are accurate. More accurate data may be treated as higher quality data and a confidence level for the expiration criteria may be increased. Subsequent treatment may also include receiving dissimilar or conflicting contributions concerning the HPOI. When there are conflicting contributions, then the data may be treated as lower quality data and the confidence level for the expiration criteria may be reduced.

Another criterion by which quality may be measured is timeliness. For example, the first contribution about a predicted expiration may have a lower confidence level than a subsequent confirmation of that predicted expiration. The subsequent confirmation may be weighted even more heavily if the subsequent confirmation is close in time to the predicted expiration or is provided by a registered user associated with the vendor (e.g., the actual vendor). The quality associated with a contribution about an expected expiration time may vary inversely with the length of time between the contribution and the expected expiration time. Predictions about events that may occur immediately may be given more weight than predictions about events that may occur in a more distant time frame.

Whether data is actually expired may depend, at least in part, on the confidence level of the expiration criteria. If the confidence level is above a threshold, then an HPOI may be expired upon the occurrence of the expiration criteria. If the confidence level is below a threshold, then an HPOI may be expired according to some other criteria (e.g., a fixed duration, a fixed point in time, default rules). In one embodiment, negative feedback could be used to more quickly eliminate a low confidence entry.

To mitigate the risk of fraud, where a user seeks to provide disinformation (e.g., incorrect location, incorrect operating hours) about an HPOI, submissions that are voted down or otherwise invalidated may be used to adjust down a trustworthiness rating for a user or to negatively impact a fraud alert rating for the user. Fraud may be intended to mislead potential consumers about the location or availability of a vendor. For example, one street vendor may want to report that a competitor street vendor has closed down or is out of produce when that competitor is actually still open. These types of potentially fraudulent submissions may be identified and may lead to the confidence level of expiration criteria related to the fraudulent provider being drastically reduced. In egregious cases, a fraudulent submitter may suffer additional sanctions, including having their HPOI removed from a local search application.

Example apparatus and methods may learn how to weight contributions from various users for computing expiration criteria. Example apparatus and methods may also learn how to weight various pieces of information for computing expiration criteria. The weights may affect the degree to which users and fields are considered in establishing expiration criteria. For example, a first user may consistently under-estimate the actual expiration time while a second user may consistently over-estimate the actual expiration time. Over time, these patterns can be detected and predicted expiration times can be adjusted based on the patterns. Similarly, certain fields may be determined to have no relationship to expiration and thus may be removed from consideration for establishing expiration criteria. Other fields may be identified as being highly correlated to actual expiration criteria and thus may be more heavily weighted in calculations.

Understanding or evaluating patterns may benefit from receiving notice about when an HPOI actually becomes invalid (e.g., closes, moves on). For example, for an HPOI that is the subject of more than a threshold number of contributions (e.g., a particularly popular coconut water vendor), crowd-sourcers, including even the vendor, may be incentivized to report when the vendor runs out of coconuts. Over time, a habitual time of day when the vendor runs out of coconuts may be determined and subsequent expiration predictions may be adapted. Relationships between predicted expiration times and actual times may be established to facilitate establishing more accurate expiration criteria going forward.

To remove barriers to contributing, free or transparent pathways for providing fresh information concerning crowd-sourced content from a mobile device may be provided. Example apparatus may be configured with a custom access point name (APN) that is configured to participate in a custom carrier agreement to insure that contributions from a registered user of the registered device will be free.

An Access Point Name (APN) is the name of a gateway between a General Packet Radio Service (GPRS) mobile network or other service/network and another computer network (e.g., Internet). GPRS usage or other service/network usage is typically charged based on the volume of data transferred. A mobile device (e.g., cellular phone) making a data connection may be configured with an APN to present to the carrier. The carrier may examine the APN to determine what type of network connection to create and how to charge for the connection and data transfers. Example apparatus may include a custom APN that allows the user to contribute user generated content for free. An APN may identify the packet data network (PDN) to which a mobile data user wants to communicate. While APNs are used in third generation protocols, similar identifiers may be used in other generation protocols. Regardless of the generation of the protocol or device, example apparatus and methods may provide a transparent connection and identifier that facilitate insuring that the user will not be billed for making the contribution.

The following use cases illustrate different ways in which example apparatus and methods may analyze crowd-sourced content to determine when to expire crowd-sourced content or an HPOI associated with crowd-sourced content. Not providing data that may no longer be fresh may improve local searches for hyperlocal points of interest by preventing the frustrating experience of looking for an HPOI that is not there. Sameera may pass by her favorite street vendor who happens to have fresh coconut water. While waiting in line for her coconut, she may open her crowd-sourcing application and add information for the hyperlocal point of interest. The information may include how long she thinks the vendor is going to be in that location, what is being sold, a comment on the quality of the item being sold, her thoughts about how frequently the vendor is in this location, her thoughts about the times the vendor is in this location, or other subjective information. After adding the data, she may submit the entry to create or update the hyperlocal point of interest. Example apparatus and methods may evaluate the quality of her submission and selectively adjust the expiration criteria for the coconut water vendor as a result of her submission.

Rajeev may be on his way home from a friend's house. His mother may text him to bring home some mangoes. Rajeev may know where a permanent grocery store is located but may also know that during this time of year the best mangoes are found at street vendors. He may open a local search application on his smart phone and be presented with hyperlocal points of interest. He may notice that one HPOI was posted by his friend just a half hour earlier and thus may visit that vendor. Rajeev may confirm his friend's post after picking out ripe mangoes. Rajeev may notice that the mango vendor is almost out of produce and may provide this information about the HPOI. Example apparatus and methods may evaluate the quality of his submission and selectively adjust the expiration criteria for the mango vendor as a result of his submission.

Later, Rajeev may be on his way to the movie and he may be hungry. Since he's already spent nearly all his money buying mangoes for the family, he's looking for an affordable street-side vendor to get a snack rather than paying the concession stand prices at the theater. Once again Rajeev may open his local search application and be presented with relevant hyperlocal points of interest. Rajeev may go to an HPOI identified by the local search application and discover that the vendor has closed for the day. Rajeev may provide this information about the HPOI so that his friends won't be sent on the same empty search. Example apparatus and methods may evaluate the quality of his submission and selectively adjust the expiration criteria for the closed vendor as a result of his submission. In this case, the local search application may refrain from returning information about the vendor in future searches because that vendor has been explicitly expired by a trusted user.

FIG. 1 illustrates an example geography that includes hyperlocal points of interest and traditional points of interest. An office building 100 may be located in one part of a city and a theatre 130 and a stadium 140 may be located in other parts of the city. At a first time of day (e.g., lunchtime), a first street vendor 110 and a second street vendor 120 may habitually position their carts near the office building 100. At a second time of day (e.g., after work), the first street vendor 110 may habitually reposition his cart near the theatre 130 while the second street vendor 120 may habitually reposition her cart near the stadium 140. The office building 100, the theater 130, and the stadium 140 may be considered to be permanent, traditional, or fixed points of interest. The two street vendors may be considered to be hyperlocal points of interest.

During the day, visitors to the first street vendor 110 may ask him how long he is going to be there and where he's going to be later or may observe how much product he has left. Based on this information, the visitors may provide expiration information about the vendor. A local search application may update its expiration criteria concerning how long the first street vendor 110 will be outside the office building 100 and, upon determining that the expiration criteria have been satisfied, may expire the HPOI or crowd-sourced content (CSC) associated with the first street vendor 110. After being expired, information about the first street vendor 110 may not be returned in a local search until the HPOI is revived. During the day, the second street vendor 120 may become sick and decide to go home early. Habitual visitors to the second street vendor 120 may notice this anomaly and provide an update concerning the HPOI. The local search application may receive information about this anomaly and selectively change the expiration criteria for the second street vendor 120. The HPOI or CSC may be immediately expired and the future (e.g., evening) position may be pre-emptively expired. FIG. 1 illustrates the anomaly by crossing out the habitual positions for the second street vendor 120. To illuminate trustworthiness, frequency, and confidence level, two reports from two trustworthy habitual visitors to the second street vendor 120 that are received within five minutes of each other may produce a high enough confidence level that expiration criteria are immediately changed and the HPOI is immediately expired. A single report from an occasional visitor whose trustworthiness may be in doubt may not yield a similar immediate result.

Figure 2:
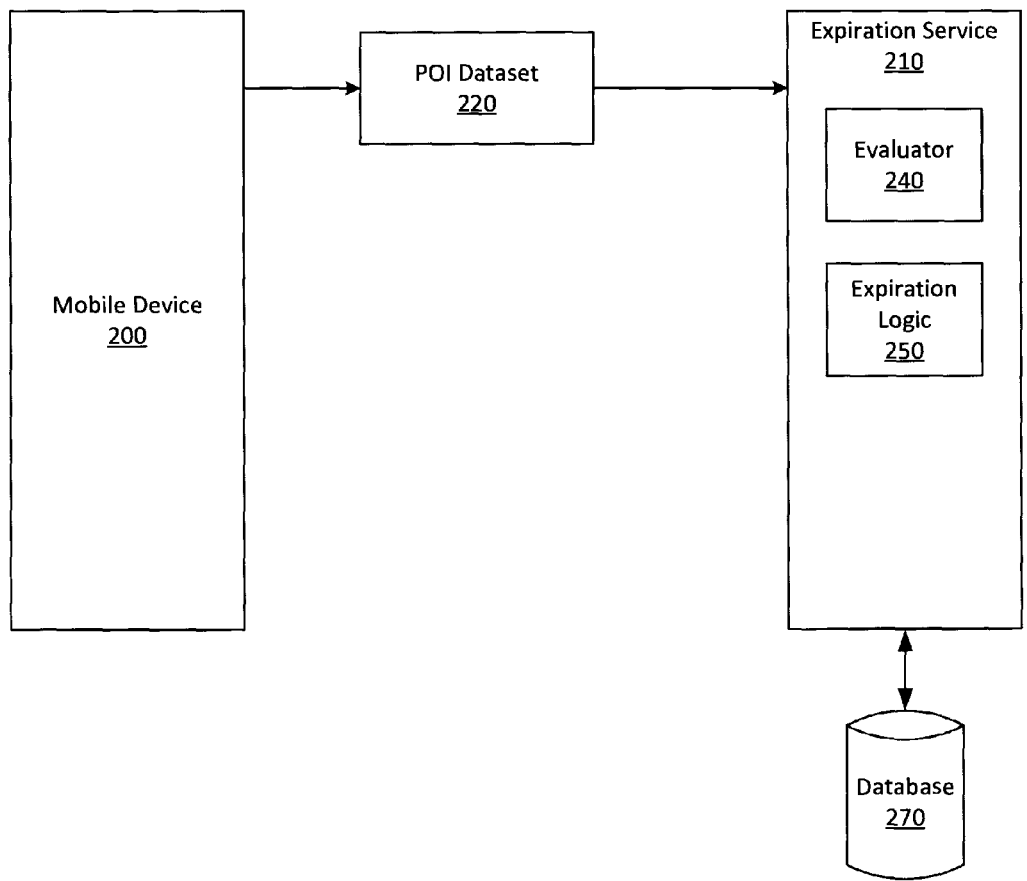
FIG. 2 illustrates an example data flow associated with dynamically expiring crowd-sourced content.

FIG. 2 illustrates an example data flow associated with dynamically expiring crowd-sourced content. A user may have a mobile device 200. The user may generate content that is provided from the mobile device 200 to an expiration service 210 as a point of interest data set 220. The expiration service 210 may evaluate the point of interest data set 220 using an evaluator 240. The evaluator 240 may, for example, determine a quality for the point of interest data set 220 as described above. An expiration logic 250 may determine expiration criteria for the point of interest based on the point of interest data set 220 and on the quality of the point of interest data set 220 as determined by the evaluator 240. The expiration criteria may identify a time, a date, a date and time, an event, or other identifiable point in time when the point of interest associated with the point of interest data set 220 should be expired. In this example, an event is a general item that may or may not have an associated date or time. Other triggers may include dates or times.

The service 210 may update an expiration criteria for the point of interest associated with the point of interest data set 220 based on the work performed on the point of interest data set 220 by the expiration logic 250. A search application may determine whether to return information about points of interest based on their expiration criteria. The point of interest data set 220 and an expiration criteria for the point of interest associated with the point of interest data set 220 may be stored in a database 270. A search application may consult the database 270 before returning information about a point of interest.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 3:
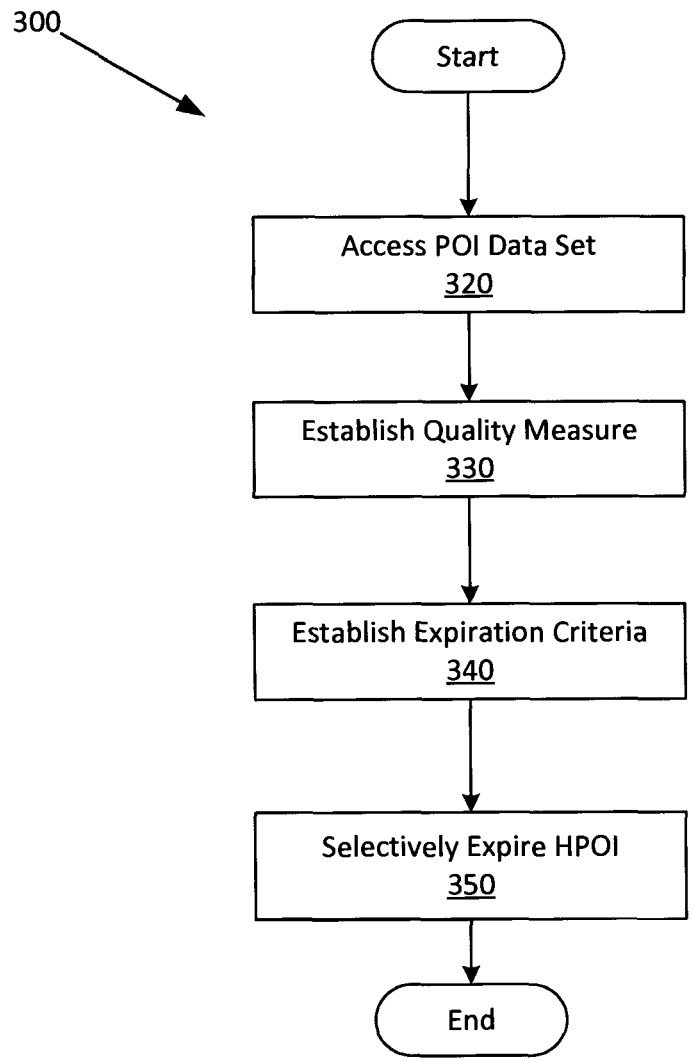
FIG. 3 illustrates an example method associated with dynamically expiring crowd-sourced content.

FIG. 3 illustrates an example method 300 associated with dynamically expiring crowd-sourced content. In different examples, method 300 may be performed on a single device, may be performed partially or completely in the cloud, may be performed on distributed co-operating devices, or may be performed other ways. In different examples, method 300 may be performed on devices including, but not limited to, a computer, a laptop computer, a tablet computer, a phone, and a smart phone.

Method 300 may include, at 320, accessing crowd-sourced content provided to a crowd-sourced database. The crowd-sourced content may be a point of interest data set. Method 300 is a computer implemented method that is performed on a computing device and thus the point of interest data set is suitable for storing on a computer-readable storage medium and for processing by, for example, a microprocessor. In one embodiment, the point of interest data set includes information concerning a hyperlocal point of interest. A hyperlocal point of interest (HPOI) may be a transient location that was created in the crowd-sourced database by a user of the crowd-sourced database. The information concerning the hyperlocal point of interest may include a predicted expiration time, a predicted expiration event, or an observed expiration of the hyperlocal point of interest.

Method 300 also includes, at 330, establishing a quality measure for the point of interest data set. In one embodiment, establishing the quality measure may be a function of a completeness of the point of interest data set. In one embodiment, establishing the quality measure may be a function of a type of data provided in the point of interest data set. In one embodiment, establishing the quality measure may be a function of a frequency of submissions related to the point of interest data set. In one embodiment, establishing the quality measure may be a function of a similarity of the point of interest data set to stored data. In other embodiments, establishing the quality measure may be a function of a location from which the point of interest data set was submitted, or of a profile of a user that provided the point of interest data set. For example, data provided from within ten feet of the HPOI may be considered of higher value than data provided from a greater distance away (e.g., more than a mile, different city, different continent). Establishing the quality measure may be a function of a combination of the factors described above or of other factors.

In one embodiment, establishing the quality measure may include evaluating subsequent treatment of the point of interest data set. In this embodiment, a confidence level or expiration criteria may be adjusted after a threshold amount of subsequent activity is analyzed. Evaluating subsequent treatment of the point of interest data set may include evaluating whether the point of interest data set was voted up or was voted down. Confirming votes may raise the quality level of data and dismissing votes may lower the quality level of data. Evaluating subsequent treatment may include determining whether the point of interest data set was validated or invalidated. Validation may include identifying whether the type of point of interest submitted is possible in the location. For example, it may not be possible for a new hot dog vendor to appear at the same GPS coordinates occupied by another validated, confirmed permanent point of interest. Data that was validated may receive a higher quality measure while data that was invalidated may receive a lower quality measure. Evaluating subsequent treatment may also include determining whether the point of interest data set was confirmed. Confirmation may include receiving similar data from subsequent crowd-sourced content concerning the point of interest.

Establishing the quality measure may lead to transforming a hyperlocal point of interest that has expiration criteria into a traditional point of interest that does not have expiration criteria. The transformation may be performed upon determining that a threshold amount of point of interest data associated with the hyperlocal point of interest has been received and that the threshold amount of point of interest data satisfies a quality threshold. For example, if one hundred trustworthy users of the crowd-sourced database have submitted at least ten contributions each to the crowd-sourced database, and if these contributions have covered at least ninety five out of one hundred days in a period, then the transient point of interest may be treated as a permanent (e.g., fixed) point of interest and expiration criteria may be relaxed or removed.

Method 300 also includes, at 340, establishing an expiration criteria for a point of interest associated with the point of interest data set. In one embodiment, the expiration criterion is a function of the point of interest data set and the quality measure. For example, higher quality CSC may be retained longer while lower quality may be expired earlier. The length of time before CSC or an HPOI is expired may vary directly with the quality of the CSC.

In one embodiment, establishing the expiration criteria may include identifying a time, a date, or an event after which the point of interest or crowd-sourced content associated with the point of interest is to be expired. The time may be a time certain or a range of time. The date may be a date certain or a range of dates. The event may be described in relation to another event (e.g., one half hour after Les Miserables lets out).

In one embodiment, establishing the expiration criteria includes establishing a confidence level for the expiration criteria. The confidence level may control whether a point of interest associated with the point of interest data set will be expired as a function of the expiration criteria. If the confidence level is above a threshold, then the expiration criteria established from the crowd-sourced content may be used to expire the point of interest. But if the confidence level is below a threshold, then the point of interest may be expired at a default time or after a default amount of time.

In one embodiment, establishing the expiration criteria is a function of the quality measure and a frequency measure. The frequency measure concerns how often or how diversely data is provided to the crowd-sourced database. For example, the frequency measure may be a function of a number of times point of interest data is provided for a selected hyperlocal point of interest, a similarity of point of interest data provided for the selected hyperlocal point of interest, a period of time over which point of interest data is provided for the selected hyperlocal point of interest, or a number of unique users of the crowd-sourced database who provide point of interest data concerning the selected hyperlocal point of interest. By way of illustration, data that is presented more than a threshold number of times (e.g., 10) in a threshold period of time (e.g., one hour) by at least a threshold number of different users (e.g., 8) may indicate that the point of interest has sufficient data for establishing expiration criteria.

In one embodiment, establishing the expiration criteria may lead to data being put in the crowd-sourced database without curation. For example, data that is set to expire relatively soon may be placed in the database without curation because it is only going to be in the database for a short time.

In one embodiment, method 300 may be an adaptive method. Therefore, over time, method 300 may dynamically adapt how the expiration criteria are computed. In one embodiment, the adapting may be based on comparing actual expiration of the hyperlocal point of interest and expiration criteria established for the hyperlocal point of interest. For example, if expiration criteria are consistently too late, which may cause users of the crowd-sourced database to be sent to transient locations that are closed or gone, then the expiration criteria computation may be changed to shorten the expiration criteria. Additionally, the importance of different fields in crowd-sourced content may change as correlations are detected. For example, a correlation between the number of fish visible in a photo of a fish vendor's stall and the actual time when the vendor runs out of fish may be identified. Therefore, an expiration criteria determination may be adapted to increase the relevance of pictures of fish at a stall.

Method 300 also includes, at 350, selectively expiring the HPOI or CSC associated with an HPOI. Expiring the HPOI may not include removing data associated with the HPOI. Instead, data may be retained for future uses including, re-displaying a point of interest when the HPOI is revived, or evaluating subsequent contributions concerning the HPOI. In one embodiment, expiring the HPOI leaves the point of interest data available for determining future expiration criteria or blocks the point of interest data from being returned in a search result for points of interest.

Figure 4:
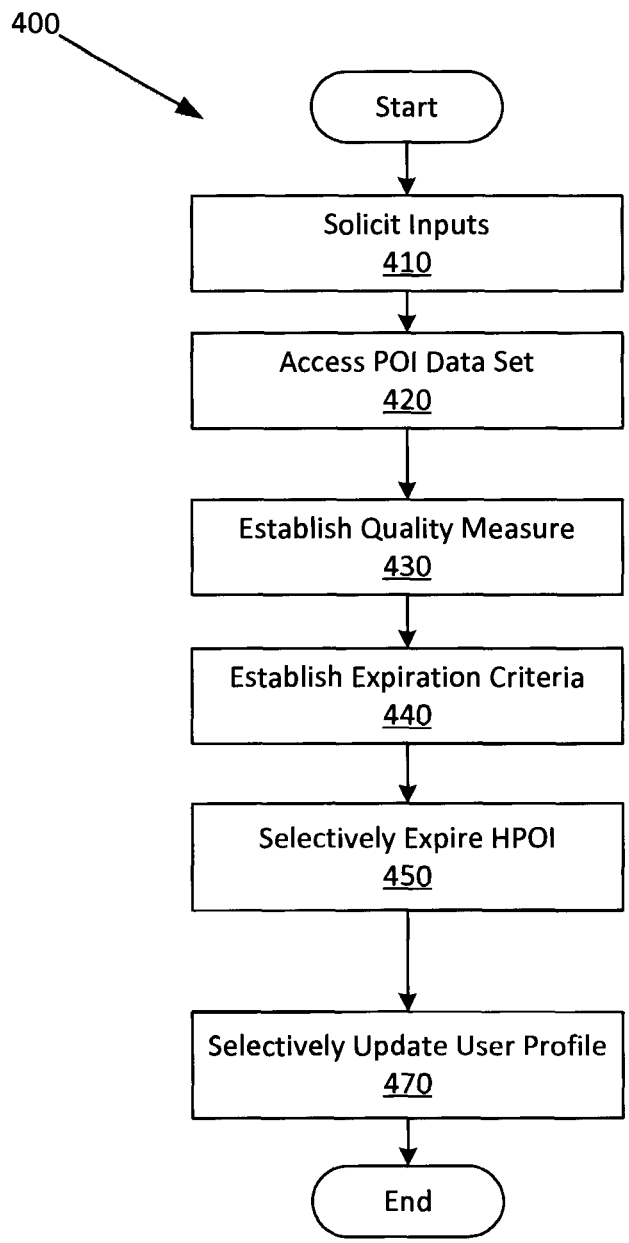
FIG. 4 illustrates an example method associated with dynamically expiring crowd-sourced content.

FIG. 4 illustrates an example method 400 associated with dynamically expiring crowd-sourced content. Method 400 includes several actions (e.g., accessing point of interest data set at 420, establishing a quality measure at 430, establishing an expiration criteria at 440, selectively expiring an HPOI at 450) similar to method 300 (FIG. 3). However, method 400 also includes additional actions.

Method 400 also includes, at 410, soliciting users that may be close to an HPOI to provide information about whether the HPOI is still active. More generally, the solicitation may concern whether data concerning expiration criteria associated with the selected point of interest is accurate. In one embodiment, only users of mobile devices who are registered contributors to the crowd-sourced database may be solicited. Since the soliciting may be geographically based, only users that have voluntarily registered to receive expiration solicitations may be solicited. Some users may be part of a rewards program that rewards users for providing certain types of information. As part of a rewards program, a user may agree to be solicited to provide expiration or confirmation information. Thus, in one embodiment, method 400 may identify that a user is close enough to see whether an HPOI is still active. The user may be presented with a "still open?" or "still there?" question that the user can simply confirm or deny. This type of solicited input may be used to adapt the expiration time for an HPOI. In one embodiment, a special category of registered user may be established for a person associated with the HPOI. Special rules for expiring an HPOI may be applied when a report is received from a trusted person associated with an HPOI. For example, an HPOI may be immediately expired or revived.

Method 400 also includes, at 470, selectively updating a user profile associated with the user. The profile may be updated as a function of a subsequent treatment of the point of interest data set. For example, subsequent positive treatment where the data is confirmed or validated may lead to updating the user profile to reflect the positive treatment. Similarly, subsequent negative treatment where the data is rejected or invalidated may lead to updating the user profile to reflect the negative treatment. Selectively updating the user profile may include manipulating a trustworthiness rating for the user or manipulating a confidence level for the user. Manipulating a rating may include writing a value to an in-memory variable, writing a value to a record, writing a value to a table, or other data manipulation. Expiration times and confidence levels may be determined, at least in part, by a user profile. Additionally, quality measurements may be determined, at least in part, by a user profile.

While FIGS. 3 and 4 illustrate various actions occurring in serial, it is to be appreciated that various actions illustrated in FIGS. 3 and 4 could occur substantially in parallel. By way of illustration, a first process could acquire point of interest data, a second process could process the point of interest data, and a third process could update expiration criteria. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including methods 300 or 400. While executable instructions associated with the above methods are described as being stored on a computer-readable storage medium, it is to be appreciated that executable instructions associated with other example methods described or claimed herein may also be stored on a computer-readable storage medium. In different embodiments the example methods described herein may be triggered in different ways. In one embodiment, a method may be triggered manually by a user. In another example, a method may be triggered automatically.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

Figure 5:
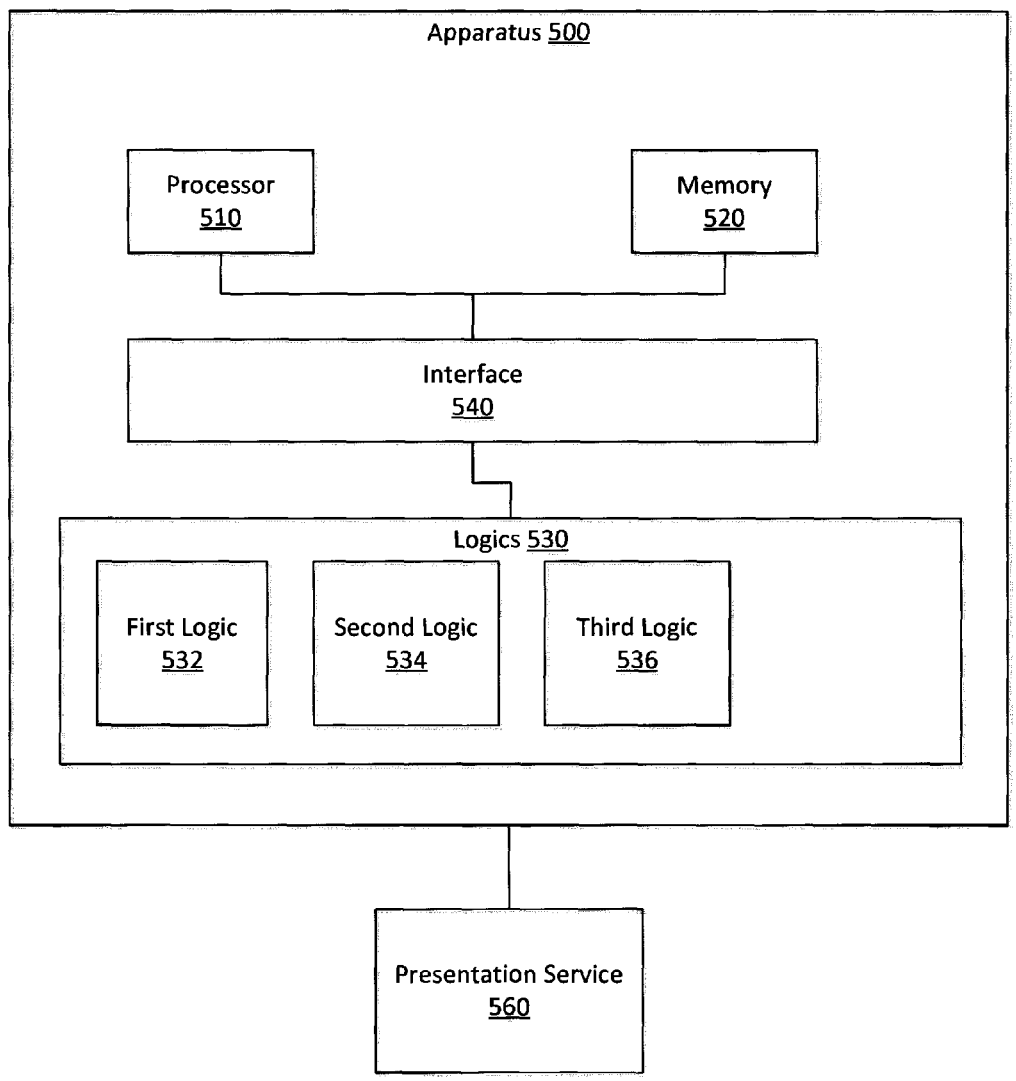
FIG. 5 illustrates an example apparatus configured to participate in dynamically expiring crowd-sourced content.

FIG. 5 illustrates an apparatus 500 that includes a processor 510, a memory 520, a set 530 of logics, and an interface 540 that connects the processor 510, the memory 520, and the set 530 of logics. The set 530 of logics may be configured to facilitate dynamically expiring crowd-sourced content based, at least in part, on a quality measurement. Apparatus 500 may be, for example, a computer, a laptop computer, a tablet computer, a personal electronic device, a smart phone, or other device that can access and process data.

In one embodiment, the apparatus 500 may be a general purpose computer that has been transformed into a special purpose computer through the inclusion of the set 530 of logics. Apparatus 500 may interact with other apparatus, processes, and services through, for example, a computer network.

In one embodiment, the first logic 532 may be configured to acquire a contribution from a user. The contribution is data associated with the crowd-sourced content. Since the data is provided by a mobile device, the data is computer data that is configured for storage on a computer-readable storage medium. The human mind is incapable of processing this type of data. Similarly, this type of data cannot be processed by pencil or paper. The contribution may be received by a computer or network communication.

In one embodiment, the first logic 532 may be configured to acquire the contribution as data concerning a transient point of interest. Since the apparatus 500 is concerned with dynamically expiring crowd-sourced content in a crowd-sourced database, the data concerning the transient point of interest may include expiration-centric information. For example, the data may include a predicted expiration time for the transient point of interest, a predicted expiration event for the transient point of interest, or an observed expiration of the transient point of interest. These predictions or observations can be used to establish expiration criteria for a point of interest and for crowd-sourced content associated with the point of interest.

The set 530 of logics may also include a second logic 534 that is configured to produce an evaluation of the contribution. In one embodiment, the second logic 534 may be configured to produce the evaluation based on different factors. The factors may include the completeness of the contribution, the timeliness of the contribution, the contents of the contribution, a user profile, a similarity of the contribution to an existing contribution, or a subsequent treatment of the contribution by other users who have contributed to the crowd-sourced database.

In one example, a contribution that is more complete may produce a higher evaluation than a contribution that is less complete. In one embodiment, the evaluation may vary directly with the completeness of the contribution. In one example, the evaluation may depend mostly on how the contribution is viewed by other contributors to the crowd-sourced database. Different weights may be accorded to different factors in different examples.

In one embodiment, the second logic 534 may be configured to selectively adapt how the evaluation is produced based on a correlation between an expiration criteria and an actual expiration. For example, certain factors may be identified as producing expiration criteria that correlate well to observations about actual expirations of a transient point of interest. An actual expiration may be, for example, the vendor closing his stand, the vendor moving the stand, or other physical changes that make the transient point of interest no longer valid. Over time, the factors that produce better correlations between predicted expirations and actual expirations may be weighted more heavily when computing expiration criteria.

The set 530 of logics may also include a third logic 536 that is configured to selectively update an expiration criteria based on the contribution, the evaluation, and the user, the expiration criteria being stored in the crowd-sourced database. Updating the expiration criteria may include writing a record to a database, editing a record in a database, writing a value to memory, sending a message to a service, or other action.

The third logic 536 may also be configured to update the user profile based on confirmation or repudiation of the contribution. When contributions from a user are confirmed by other users, the user may receive an improved rating. When contributions from a user are repudiated or rejected by other users, the user may receive a diminished rating. Quality determinations and expiration predictions may be based, at least in part, on a user profile. Updating the profile may include writing a record to a database, editing a record in a database, writing a value to memory, sending a message to a service, or other action.

In different embodiments, some processing may be performed on the apparatus 500 and some processing may be performed by an external service or apparatus. Thus, in one embodiment, apparatus 500 may also include a communication circuit that is configured to communicate with an external source to facilitate displaying point of interest data or expiration notifications. In one embodiment, the third logic 536 may interact with a presentation service 560 to facilitate displaying data using different presentations for different devices. For example, the graphics quality of a notification may be tailored to the type of device to which the notification is being provided. Additionally, the presentation service 560 may localize a notification. Localizing the notification may include, for example, translating the notification to a language associated with the user of the mobile device.

Figure 6:
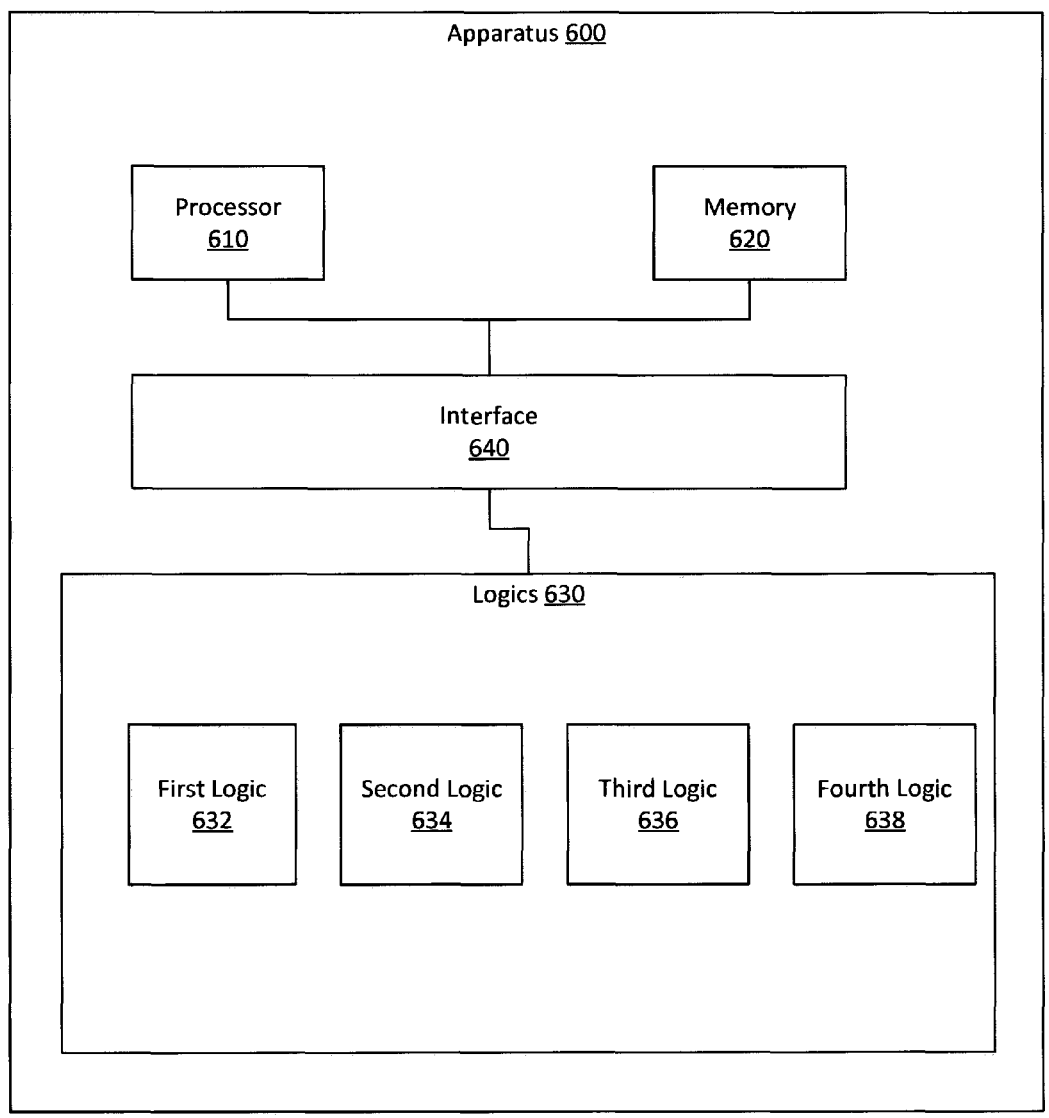
FIG. 6 illustrates an example apparatus configured to participate in dynamically expiring crowd-sourced content.

FIG. 6 illustrates an apparatus 600 that is similar to apparatus 500 (FIG. 5). For example, apparatus 600 includes a processor 610, a memory 620, a set of logics 630 (e.g., 632, 634, 636) that correspond to the set of logics 530 (FIG. 5) and an interface 640. However, apparatus 600 includes an additional fourth logic 638. The fourth logic 638 may be configured to selectively expire the point of interest (POI) or CSC associated with the POI. The point of interest or CSC associated with the POI may be selectively expired based, at least in part, on the expiration criteria. For example, if a date or time is reached beyond a date or time in the expiration criteria, then the point of interest or CSC associated with the POI may be expired. In another example, if an event identified in the expiration criteria occurs (e.g., cricket match ends), then the point of interest or CSC associated with the POI may be expired. Expiring the point of interest may not involve removing from the crowd-sourced database all data associated with the point of interest. Instead, expiring the transient point of interest may allow data in the crowd-sourced database that is associated with the transient point of interest to be used in evaluations of other future contributions for the point of interest or for other similar or related points of interest. Expiring the point of interest or CSC associated with the POI may include flagging or marking data in a database, writing a value to a field, writing a value to a variable, moving data from an active location to an expired location, sending a message to a service, or other action.

Figure 7:
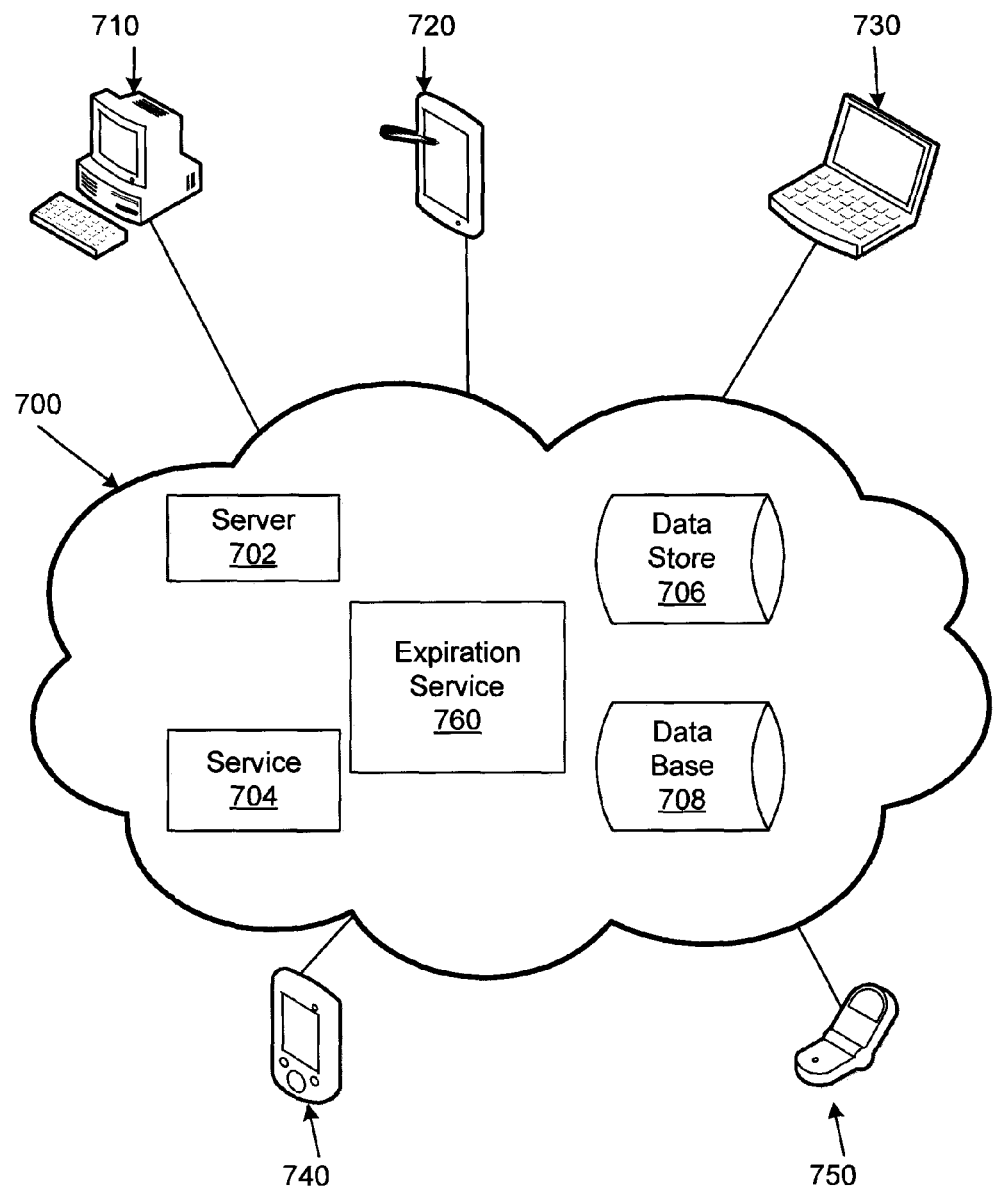
FIG. 7 illustrates an example cloud operating environment.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example expiration service 760 residing in the cloud. The expiration service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the expiration service 760.

FIG. 7 illustrates various devices accessing the expiration service 760 in the cloud. The devices include a computer 710, a tablet 720, a laptop computer 730, a personal digital assistant 740, and a mobile device (e.g., cellular phone, satellite phone) 750. The expiration service 760 may evaluate crowd-sourced content, compute an expiration criteria (e.g., time, event) and selectively expire crowd-sourced content associated with an HPOI, among other actions.

It is possible that different users at different locations using different devices may access the expiration service 760 through different networks or interfaces. In one example, the expiration service 760 may be accessed by a mobile device 750. In another example, portions of expiration service 760 may reside on a mobile device 750.

Figure 8:
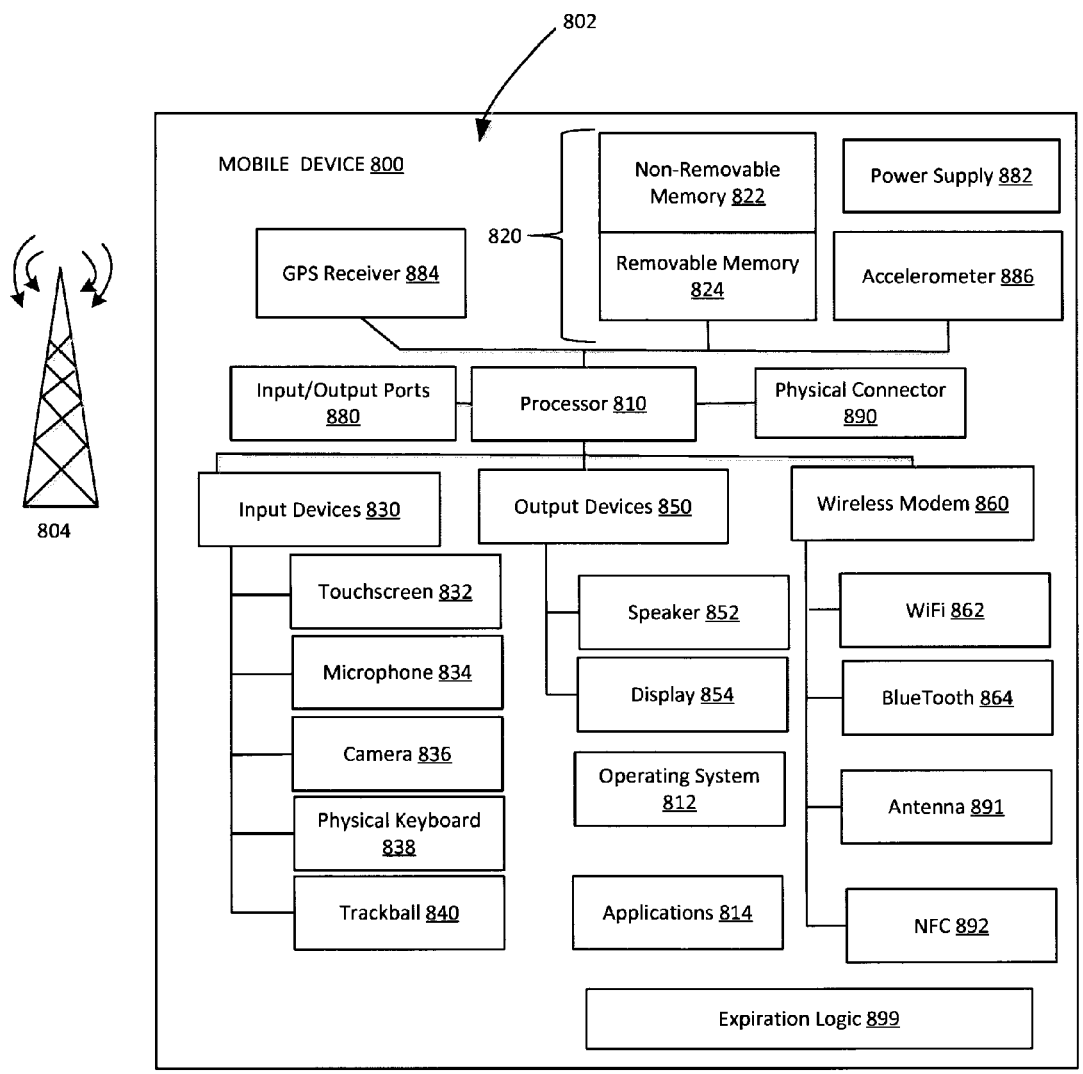
FIG. 8 is a system diagram depicting an exemplary mobile communication device configured to participate in dynamically expiring crowd-sourced content.

FIG. 8 is a system diagram depicting an exemplary mobile device 800 that includes a variety of optional hardware and software components, shown generally at 802. Components 802 in the mobile device 800 can communicate with other components, although not all connections are shown for ease of illustration. The mobile device 800 may be a variety of computing devices (e.g., cell phone, smartphone, handheld computer, Personal Digital Assistant (PDA), etc.) and may allow wireless two-way communications with one or more mobile communications networks 804, such as a cellular or satellite networks.

Mobile device 800 can include a controller or processor 810 (e.g., signal processor, microprocessor, ASIC, or other control and processing logic circuitry) for performing tasks including signal coding, data processing, input/output processing, power control, or other functions. An operating system 812 can control the allocation and usage of the components 802 and support application programs 814. The application programs 814 can include mobile computing applications (e.g., email applications, calendars, contact managers, web browsers, messaging applications), or other computing applications.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is well known in GSM communication systems, or other memory storage technologies, such as "smart cards." The memory 820 can be used for storing data or code for running the operating system 812 and the applications 814. Example data can include web pages, text, images, sound files, video data, or other data sets to be sent to or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). The identifiers can be transmitted to a network server to identify users or equipment.

The mobile device 800 can support one or more input devices 830 including, but not limited to, a touchscreen 832, a microphone 834, a camera 836, a physical keyboard 838, or trackball 840. The mobile device 800 may also support output devices 850 including, but not limited to, a speaker 852 and a display 854. Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can include input devices and software that allow for user interaction via a user's spatial gestures, such as detecting and interpreting gestures to provide input to a gaming application.

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). Mobile device 800 may include a near field communication (NFC) component 892 to facilitate near field communications.

The mobile device 800 may include at least one input/output port 880, a power supply 882, a satellite navigation system receiver 884, such as a Global Positioning System (GPS) receiver, an accelerometer 886, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include an expiration logic 899 that is configured to provide a functionality for the mobile device 800. For example, expiration logic 899 may provide a client for interacting with a service (e.g., service 760, FIG. 7). Portions of the example methods described herein may be performed by expiration logic 899. Similarly, expiration logic 899 may implement portions of apparatus described herein.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one of, A, B, and C" is employed herein, (e.g., a data store configured to store one of, A, B, and C) it is intended to convey the set of possibilities A, B, and C, (e.g., the data store may store only A, only B, or only C). It is not intended to require one of A, one of B, and one of C. When the applicants intend to indicate "at least one of A, at least one of B, and at least one of C", then the phrasing "at least one of A, at least one of B, and at least one of C" will be employed.

To the extent that the phrase "one or more of, A, B, and C" is employed herein, (e.g., a data store configured to store one or more of, A, B, and C) it is intended to convey the set of possibilities A, B, C, AB, AC, BC, ABC, AA . . . A, BB . . . B, CC . . . C, AA . . . ABB . . . B, AA . . . ACC . . . C, BB . . . BCC . . . C, or AA . . . ABB . . . BCC . . . C (e.g., the data store may store only A, only B, only C, A&B, A&C, B&C, A&B&C, or other combinations thereof including multiple instances of A, B, or C). It is not intended to require one of A, one of B, and one of C. When the applicants intend to indicate "at least one of A, at least one of B, and at least one of C", then the phrasing "at least one of A, at least one of B, and at least one of C" will be employed.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed in a computer for selectively updating data stored in a database, comprising:
   accessing information associated with crowd-sourced content in the database stored on a computer-readable storage medium;
   accessing data representing an item associated with the crowd-sourced content comprising expiration criteria, where the expiration criteria is a function of the crowd-sourced content and a quality measure for the crowd-sourced content;
   selectively expiring the item or the crowd-sourced content based on the expiration criteria, where expiring the item or the crowd-sourced content includes deleting the crowd-sourced content from the databased stored on the computer-readable storage medium; and
   selectively transforming the item, wherein the item comprises a transient item having expiration criteria, into a traditional item that does not have expiration criteria upon determining that a threshold amount of crowd-sourced content associated with the transient item has been received and that the threshold amount of crowd-sourced content satisfies a specific condition.

2. The method of claim 1, where the computer is a handheld computing device, and where the method includes updating a display on the handheld computing device upon expiring the item.

3. The method of claim 1, comprising establishing the quality measure, where establishing the quality measure is a function of a completeness of the crowd-sourced content, a type of data provided in the crowd-sourced content, a frequency of submissions related to the crowd-sourced content, a similarity of the crowd-sourced content to other data stored in the crowd-sourced database, a location from which the crowd-sourced content was submitted, or a profile of a user that provided the crowd-sourced content.

4. The method of claim 3, where establishing the quality measure includes evaluating subsequent treatment of the crowd-sourced content, where evaluating subsequent treatment of the crowd-sourced content set includes evaluating whether the item was voted up, evaluating whether the item was voted down, evaluating whether the item was validated, evaluating whether the item was invalidated, or evaluating whether the item was confirmed.

5. The method of claim 3, comprising establishing the expiration criteria, where establishing the expiration criteria includes identifying a time, a date, or an event after which the item or the crowd-sourced content is to be expired, and where establishing the expiration criteria includes establishing a confidence level for the expiration criteria, where the confidence level controls, at least in part, whether the item associated with the crowd-sourced content or the crowd-sourced content will be expired as a function of the expiration criteria.

6. The method of claim 1, comprising dynamically adapting the expiration criteria based on comparing actual expiration of the item and an expiration criteria established for the item.

7. The method of claim 1, where information concerning the expiration criteria includes a predicted expiration time, a predicted expiration event, or an observed expiration of the item, where the transient item is transient in time or space.

8. A computer-readable storage medium storing computer-executable instructions that when executed by a device control the device to perform operations comprising:
   accessing electronic crowd-sourced content in a crowd-sourced database stored on a second computer-readable storage medium;
   establishing in the device or in the crowd-sourced database a quality measure for the crowd-sourced content;
   establishing in the device or in the crowd-sourced database an item associated with the crowd-sourced content comprising expiration criteria, where the expiration criteria is a function of the crowd-sourced content and the quality measure;
   selectively expiring the item or the crowd-sourced content based on the expiration criteria, where expiring the item or the crowd-sourced content includes deleting the crowd-sourced content from the crowd-sourced database stored on the second computer-readable storage medium; and
   selectively transforming the item, wherein the item comprises a transient item having expiration criteria, into a traditional item that does not have expiration criteria upon determining that a threshold amount of crowd-sourced content
   associated with the transient item has been received and that the threshold amount of crowd-sourced content satisfies a specific condition.

9. The computer-readable storage medium of claim 8, the operations comprising:
   upon determining that the time at which the expiration criteria are to be satisfied is sooner than a threshold amount of time, adding the crowd-sourced content to a curated crowd-sourced content data store associated with the crowd-sourced database without curating the data.

10. The computer-readable storage medium of claim 8, the operations comprising:
   upon detecting that a user of the mobile device is at a selected location associated with the item, the user being a registered contributor to the crowd-sourced database, soliciting the user to provide an observation concerning the item, where the observation concerns whether data concerning expiration criteria associated with the selected point of interest is accurate.

11. The computer-readable storage medium of claim 8, where information concerning the transient item includes a predicted expiration time, a predicted expiration event, or an observed expiration of the hyperlocal point of interest, where the transient item is transient in time or space.

12. A computing device, comprising:
   a processor;
   a memory;
   a communication circuit;
   a set of logics configured to dynamically expire crowd-sourced content provided to a crowd-sourced database; and
   an interface coupled to the processor, the memory, the communication circuit, and the set of logics;
   the set of logics comprising:
      a first logic that acquires a contribution from a user, where the contribution is data associated with the crowd-sourced content, and where the data is stored on a computer-readable storage medium, where the first logic acquires the contribution as data concerning a transient item, where the data concerning the transient item includes a predicted expiration time for the transient item, a predicted expiration event for the transient item, or an observed expiration of the transient item;
      a second logic that produces an evaluation of the contribution,
      where the second logic produces the evaluation based on the completeness of the contribution, the timeliness of the contribution, the contents of the contribution, a user profile, a similarity of the contribution to an existing contribution, or a subsequent treatment of the contribution by other users who have contributed to the crowd-sourced database, and
      where the second logic selectively adapts how the evaluation is produced based on a correlation between an expiration criteria and an actual expiration;
      a third logic that selectively updates an expiration criteria for the crowd-sourced content based on the contribution and the evaluation, the expiration criteria being stored in the crowd-sourced database, where the third logic selectively updates the expiration criteria based on the user profile and where the third logic updates the user profile based on a confirmation of the contribution, a rejection of the contribution, or the evaluation of the contribution; and
      a fourth logic that selectively expires the crowd-sourced content based, at least in part, on the expiration criteria, where expiring the crowd-sourced content causes data in the crowd-sourced database that is associated with the crowd-sourced content to be used in evaluations of other crowd-sourced content.

13. The computing device of claim 12, the computing device being a telephone.

* * * * *